United States Patent [19]

Hamman

[11] 3,791,684
[45] Feb. 12, 1974

[54] ELECTRIC STARTER MOTOR

[75] Inventor: Lyle J. Hamman, Eaton Rapids, Mich.

[73] Assignee: Eaton Stamping Company, Eaton Rapids, Mich.

[22] Filed: Aug. 24, 1972

[21] Appl. No.: 283,559

[52] U.S. Cl................. 290/38, 290/48, 310/258, 310/159
[51] Int. Cl............................................. F02n 11/14
[58] Field of Search... 310/254, 258, 259, 179, 180; 293/37, 38, 48; 123/179

[56] References Cited
UNITED STATES PATENTS

| | | | |
|---|---|---|---|
| 2,944,427 | 7/1960 | Antonidis et al. | 290/38 |
| 1,173,153 | 2/1916 | Stull | 310/258 |
| 2,667,591 | 1/1954 | Gindroz | 310/258 |

*Primary Examiner*—G. R. Simmons
*Attorney, Agent, or Firm*—Beaman & Beaman

[57] ABSTRACT

An electric starter motor for starting small internal combustion engines characterized by its high torque and compact size having a housing including four sides of convex configuration facilitating the winding of four field coils formed of mechanically interconnected and nested laminations defining a stack having annular synthetic insulators at the ends wherein the field wire coils are wrapped about both the poles defined by the laminations and aligned recessed insulators. The motor brushes are mounted upon a brush card, and the armature includes an extension extending from the housing upon which Bendix type starter apparatus is mounted. Four field coils and brushes are employed, and in the DC energized embodiment, two of the field coils are mounted in parallel and connected to one brush, while the other two field coils are connected in parallel with each other, and connected to an opposing brush. The coil connected brushes are shunted to equalize the voltage at the armature commutator.

8 Claims, 12 Drawing Figures

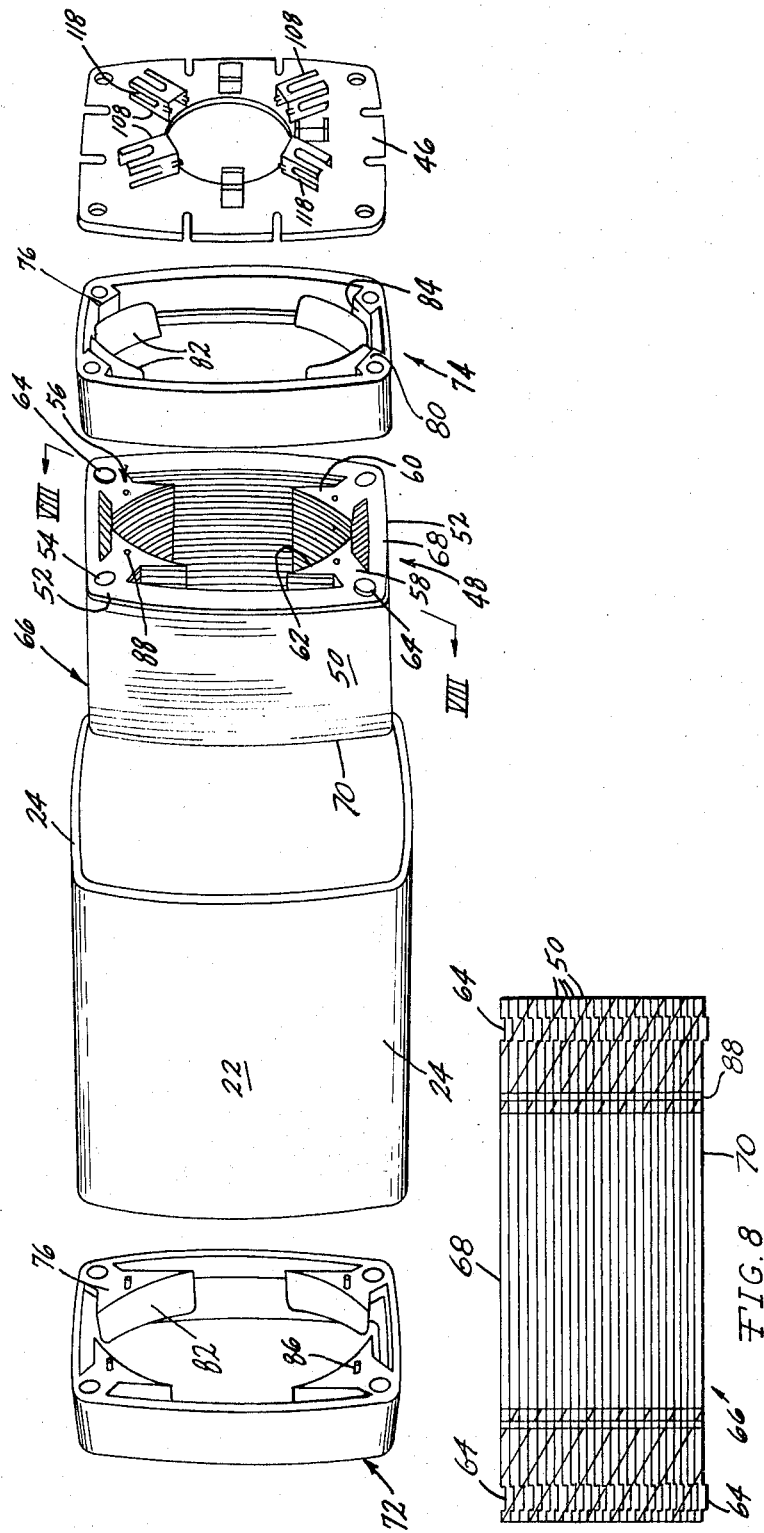

3,791,684

ELECTRIC STARTER MOTOR

BACKGROUND OF THE INVENTION

The invention pertains to electric motors for starting internal combustion engines.

In the development of electric starters for internal combustion engines, particularly in the application of starting automobile vehicle engines, the requirement is for a starting motor capable of producing high torque from a relatively low voltage source. Usually, the vehicle battery is either of the 6 volt or 12 volt type, and the battery must be capable of producing sufficient output to drive an electric motor which may be called upon to crank an internal combustion multicylinder engine. Through the years the electric starter motor art has progressed, and dependable internal combustion engine electric starting has been achieved for large internal combustion engines wherein the electric starter motors are of a relatively concise configuration, and capable of producing the desired torque characteristics from 6 to 12 volt power sources.

While the electric starter motor art for larger size internal combustion engines as used in motor vehicles is highly developed, until recently, little development had taken place with respect to the development of electric starter systems for small internal combustion engines. In particular, a need has developed for electric starting systems for small internal combustion engines such as used on lawn mowers, garden tools, small generators, garden tractors, and the like. Such electric starting systems must be of a very concise nature, economical to manufacture and service, and must utilize batteries of small size and relatively limited capacity. My U. S. Pat. No. 3,536,051 pertains to a basic electric starting system for small internal combustion engines.

Previously, electric motors have not been available for use in starting small internal combustion engines wherein the required economy of manufacture is combined with the ability of the motor to produce a high cranking torque, with a relatively limited battery power source. Starters mounted upon small internal combustion engines are subjected to much vibration as such engines are usually of a single cylinder construction, and dependability of starter motor operation under such conditions is required, and previously available electric motors have not met the requirement for this type of application.

SUMMARY OF THE INVENTION

It is an object of the invention to produce a small electric motor which is capable of producing starting torque sufficient for cranking and starting small internal combustion engines. The motor may be wound to utilize either 110 volt AC, or 12 volt DC power sources.

As starter motors in accord with the invention are utilized with relatively inexpensive equipment, such as domestic lawn mowers, the starter is of an economical construction, yet dependable in operation, and able to withstand the vibration, dirt, and other deleterious environmental influences attendant with the mounting of the starter directly upon an internal combustion engine used for lawn mowing, gardening, and the like.

The motor housing is of a generally rectangular configuration having four sidewalls. However, the sidewalls, rather than being planar, are of an outwardly convex configuration having an axis of generation parallel to the housing longitudinal axis wherein additional clearance is provided within the motor housing to permit winding of the field pole coils. The field coils are defined by a plurality of metal laminations mechanically interconnected by a partially punched indentation producing a nesting and interfitting between adjacent laminations. The ends of the stack of laminations cooperate with synthetic annular insulators each having pole recesses defined thereon which open toward the associated housing end, and the insulator recesses are in alignment with the lamination poles wherein wire coiled about the field poles is received within the insulator recesses. In this manner the field coils are positively maintained in position, and properly insulated to produce dependable operation, and resist field coil wire movement, and possible field shorting.

End caps are mounted upon the housing ends and include bearing structure for rotatably supporting an armature extending through the field. The armature includes a shaft extending from the housing upon which a thread and flywheel engaging gear pinion is mounted. A stop is also defined upon the armature extension for limiting axial movement of the pinion gear, and a spring biases the pinion gear away from the stop to the "at rest" position of the pinion gear.

The motor utilizes four brushes mounted upon a brush card, and assembly of the brushes to the motor is simplified by the use of this card. Additionally, the brush card minimizes the likelihood of shorting, and a shunt is employed to interconnect those brushes connected to the field in order to equalize voltages at the brushes.

The utilization of the many features of construction meets the basis objects as set forth above, and the invention is directed to an improved electric starter motor having particular advantage when used to start small internal combustion engines.

BRIEF DESCRIPTION OF THE DRAWINGS

The aforementioned advantages and objects of the invention will be appreciated from the following description and accompanying drawings wherein:

FIG. 7 is an exploded, perspective view of the motor housing and field components, including the brush card, FIG. 8 is an elevational, sectional view of the field stack laminations as assembled, as taken along Sections VIII—VIII of FIG. 7.

DESCRIPTION OF THE PREFERRED EMBODIMENT

Figure 1:
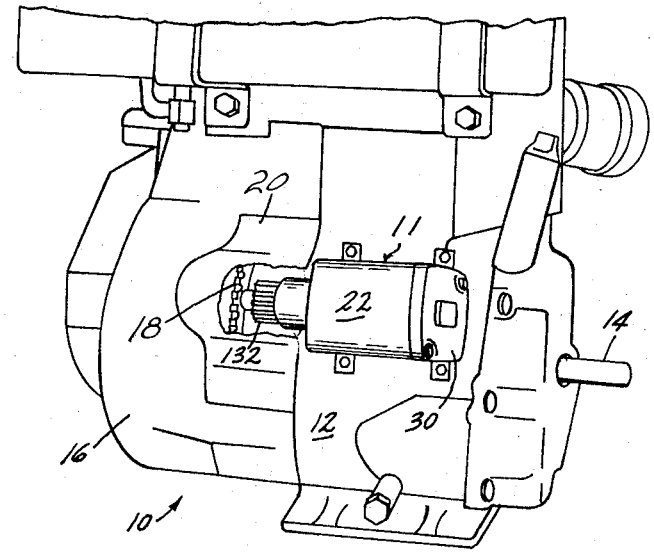
FIG. 1 is an elevational view of an internal combustion engine employing an electric starting motor in accord with the invention.

The environment in which an electric starter motor in accord with the invention may be used is illustrated in FIG. 1. In FIG. 1 a horizontal crankshaft internal combustion engine is indicated at 10 wherein the engine includes a primary body and crankcase 12, a power output shaft 14, a flywheel housing 16, and a flywheel 18 having gear teeth defined upon the periphery thereof. This type of internal combustion engine is widely used with garden tractors and small power equipment. These same basic components are also present in vertical crankshaft engines such as commonly used with rotary lawn mowers, and the electric starter motor finds wide usage with this type of internal combustion engine.

The electric starter motor 11 is mounted to the engine upon suitable support structure, usually the engine cylinder, wherein the starter drive mechanism of the starter motor, as will be later described, is disposed adjacent the flywheel 18 such that the starter gear pinion will engage the teeth of the flywheel upon the starter motor being energized. Of course, a shroud or cover 20, which forms a part of housing 16 normally encompasses the starter motor gear pinion, and this cover portion is broken away in FIG. 1 for purpose of illustration.

Figure 2:
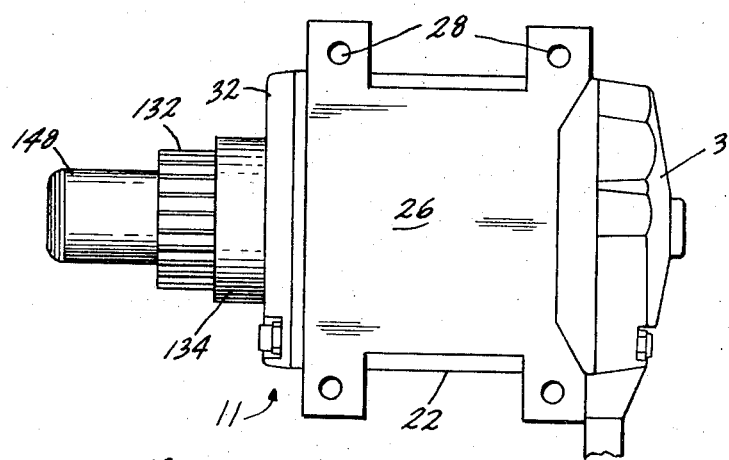
FIG. 2 is a bottom view of the electric starter motor, per se, in accord with the invention.

The electric starter motor includes a generally rectangular housing 22, having four sidewalls 24 and ends define the housing axial length. The housing 22 is preferably formed of sheet steel, and a mounting bracket 26 is welded to the housing, FIGS. 2 and 4, for mounting the motor to the engine 10. The mounting bracket includes holes 28 receiving bolts for attaching the motor to the internal combustion engine body.

Figure 5:
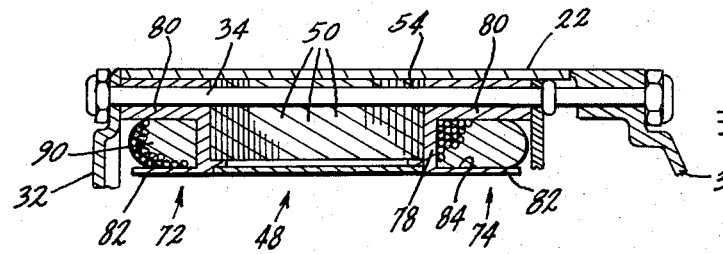
FIG. 5 is an enlarged, elevational, detail, sectional view of a field coil pole.
Figure 6:
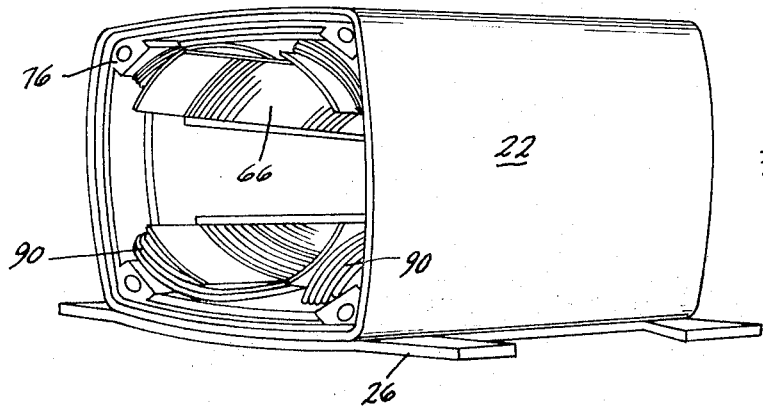
FIG. 6 is an elevational, perspective view of the motor housing and field, per se, no end caps or armature being associated therewith.

End caps 30 and 32 are mounted upon the ends of the housing 22, and are assembled thereto by the usual tie bolts 34, FIG. 5, extending through the field, and provided with nuts and heads at the ends for maintaining the end caps on the ends of the housing.

The end cap 30 includes a bearing 36 while the end cap 32 includes a bearing 38, and the armature 40 is rotatably mounted within the bearings 36 and 38 and includes a shaft extension 42 extending through the bearing 38 and located externally of the housing 22 upon which the engine starter structure is mounted, as will be later described.

The armature 40 includes a commutator 44, and the brushes engaging the commutator are mounted upon a brush card 46 located adjacent the end cap 30, and within the housing 22. In the disclosed embodiment four brushes are utilized, and mounted upon the brush card in a manner which will be later described in more detail.

The housing 22 supports the motor field 48 which is formed by a plurality of laminations, end insulators, and wire coils. The laminations of the field consist of a plurality of metal laminations 50 having a configuration which will be appreciated from FIG. 7. Each lamination includes a periphery having four convex sides 52 corresponding to the inner configuration of the housing 22. Thus, four corners are defined upon each lamination and in two opposed corners a hole 54 is defined which receives the tie rods 34. Additionally, the corner of each lamination is provided with an internally projecting pole 56, including a neck portion 58 and a "head" 60. The head 60 includes the circular concave surface 62 which is concentric with the housing axis, and the rotation axis of the armature 40.

At two opposed corners each lamination is indented at 64, FIG. 8, and such indentations are formed during manufacture, and during assembly the indentations of adjacent laminations "nest," with a press fit wherein the laminations constituting a field are tightly assembled as a stack 66, FIG. 8, having ends 68 and 70. The extent of interconnection achieved by the indentations 64 is such that considerable force is required to pry the laminations apart, and thus the stack may be easily handled during motor assembly.

The insulators 72 and 74 are of similar, but not identical, configuration. The insulators are formed of a synthetic plastic dielectric material, and are of a molded, annular configuration including an outer periphery of four outwardly convex sides as to be closely received within the housing 22. Each insulator includes four portions 76, defined at each inside corner, including an inward projection 78, FIG. 5, an outer axially extending portion 80, and an inwardly spaced axially extending portion 82. Thus, the portions 78, 80, and 82 define a recess 84 which is open toward the adjacent housing end when the field lamination stack 66 and insulators are mounted within the housing 22.

Of course, the insulator corner portions 76, when located within the housing 22, are in alignment with the lamination pole portions 56, and the configuration of the axially extending portions 76 substantially corresponds with that of the neck 58 and head 60. The inner sides of the insulators 72 and 74 include small studs 86 which are received within the holes 88, defined in the lamination heads 60, FIG. 7.

Figure 3:
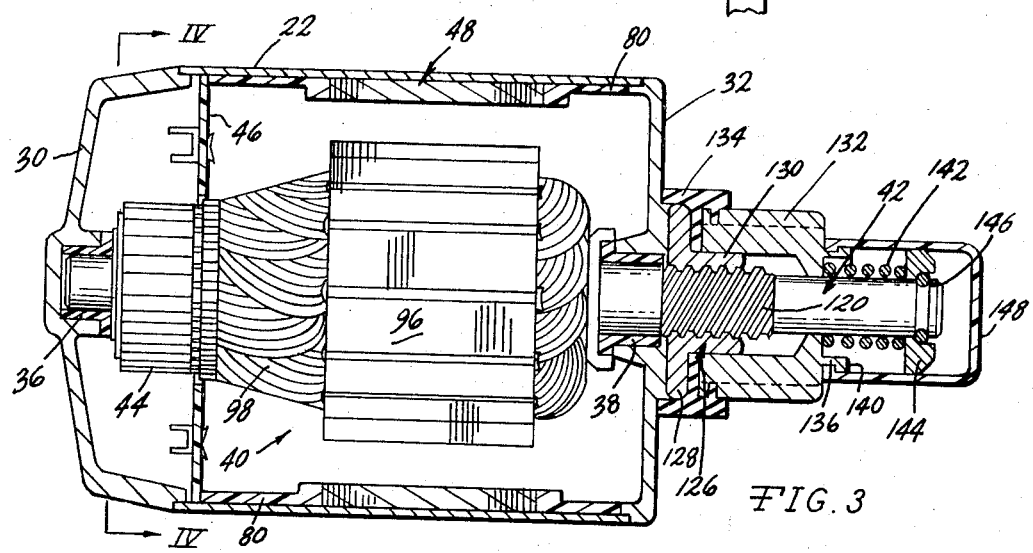
FIG. 3 is a diametrical, elevational, sectional view of a starter motor in accord with the invention.

The lamination stack 66 is located at the central region of the housing 22 intermediate the housing ends, FIG. 3. Thereupon, the insulators 72 and 74 are inserted from each end of the housing, into the housing, into engagement with the stack such that the studs 86 are received within holes 88. The insulator portions 76 align with the pole portions 56, and the four field coils may be readily formed by insulator conductor wire 90, FIG. 5, by passing the coil wire around the necks 58 of the poles, and into the recesses 84 of the insulators located at each end of each pole. Thus, the wire coils will maintain the insulators in place, and vice versa, and the insulator portions 82 will confine the curved or return portion of the wire coils thereby insuring proper location of the wire coils on the field coils and preventing shorting of the coils due to abrasion with the armature. The aforedescribed field coil construction permits the field coils to be readily wound by automatic equipment such as manufactured by The Globe Tool and Engineering Company of Dayton, Ohio, Model HSWM 11.

Figure 9:
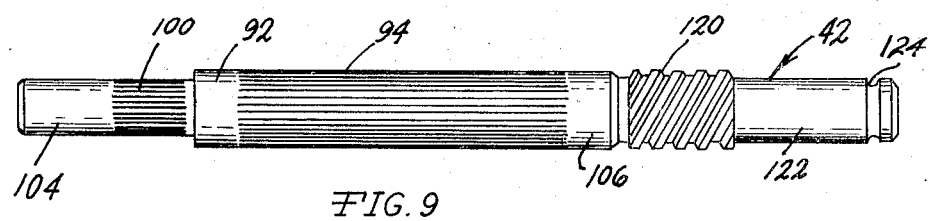
FIG. 9 is an elevational view of the armature shaft, per se.
Figure 10:
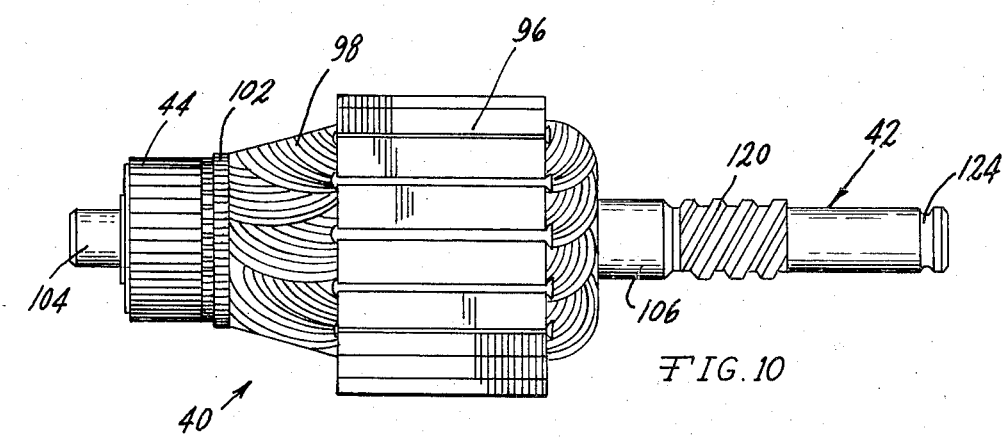
FIG. 10 is an elevational view of the armature shaft, and other armature components after the armature coils and laminations, and commutator, have been attached thereto.

The armature 40 is formed upon a shaft 92 as shown in FIG. 9. The shaft 92 includes a central knurled portion 94 upon which the armature pole laminations 96 are pressed. The armature consists of a plurality of sheet metal laminations constructed in accord with known practice, and the armature poles are wound with an insulated wire 98 upon a Model HFA 1 armature winding machine manufactured by The Globe Tool and Engineering Company of Dayton, Ohio. The armature coils are connected to the commutator 44 mounted upon the armature shaft knurled portion 100, and electrically connected thereto by tabs 102 bent over upon themselves, and upon the coil wires. Preferably, the tabs 102 are fused to the wires to insure a strong electrical interconnection between the commutator segments and the armature coils.

The armature shaft 92 also includes a cylindrical bearing portion 104, which is received in the end cap bearing 36, FIG. 3, and a cylindrical bearing portion 106, received within the end cap bearing 38.

Figure 4:
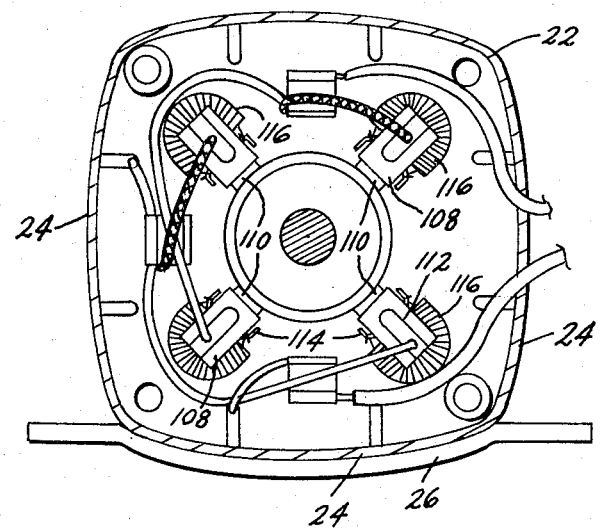
FIG. 4 is an elevational, sectional view of the brush card and commutator as taken along Section IV—IV of FIG. 3.

The motor brushes are mounted upon a dielectric brush card 46, shown in detail in FIGS. 4 and 7. The brush card has an outer periphery corresponding to the inner configuration of the housing 22, and is located within the housing adjacent the left field coil insulator 72, FIG. 3. The end edge of the insulator 72 positions the brush card within the housing and maintains the same perpendicular to the housing axis. Four brush holders 108 are mounted upon the brush card 46 and each includes a rectangular internal chamber in which a carbon or graphite brush 110 is received, FIG. 4. The brush holders 108 include slots 112 through which the brush conductors extend. Each brush holder includes a pair of lanced projections 114, FIG. 4, which serve as an anchor for a tension spring 116 passed about the end of each brush holder, engaging the end of a brush for biasing the associated brush inwardly into electrical contact with the armature commutator 44. As will be appreciated in FIG. 7, the brush holders are notched at 118 in their lateral sides to receive the springs 116, and permit the springs to engage the associated brush 110. The details of the brush card 46 forms the subject matter of my U.S. Pat. application Ser. No. 283,525 filed Aug. 24, 1972.

The starter structure for engaging the engine flywheel 18 is mounted upon the armature shaft extension 42, and is best appreciated from FIG. 3. The shaft 42 includes a threaded portion 120, a cylindrical portion 122, and a groove 124 is defined adjacent the outer end of the extension.

A hub 126 having internal threads is threadedly mounted upon the threads 120, FIG. 3, and includes a radially extending flange 128, and axially extending hub portion 130. A pinion gear 132 is mounted upon the hub portion 130 and is capable of rotation with respect to the hub portion, and a resilient friction member 134 of annular configuration is imposed between the left end of the pinion 132 and the radial flange 128. In practice, the friction material 134 is molded upon the pinion gear, and includes a radial face which engages the radial face of the flange.

The pinion gear 132 also includes an axially extending sleeve 136 terminating in a stop engaging abutment surface 140, and includes an inner surface of sufficient radial dimension to provide radial clearance for the compression spring 142. An annular stop member 144 is attached to the outer end of the shaft extension by a snap ring 146 received in the groove 124. The spring 142 bears against the stop 144, and the end of the gear 132, and in this manner the spring biases the pinion away from the stop. The sleeve 136, spring 142, and stop 144, are preferably enclosed within a housing cap 148, of synthetic material.

In operation, the electric starter motor is mounted upon a suitable location upon the internal combustion engine 10, such that when the pinion gear 132 is in the position shown in FIG. 3 the pinion is out of alignment with the flywheel gear teeth. However, upon energization of the starter motor, rotation of the armature 40 causes the hub 126 to move the pinion gear 132, FIG. 3, to the right due to the relative rotation between the thread 120 and the hub. This relative rotation axially displaces the pinion gear into alignment with the flywheel gear teeth, and compresses spring 142. Pinion gear 132 may move to the right until the surface 140 engages the stop 144.

Intermeshing of the pinion gear 132 with the flywheel teeth will crank the internal combustion engine, starting the same. As soon as the engine starts the resultant rotation of the pinion gear will "screw" the pinion gear and hub upon the thread 120 to disengage the pinion gear from the flywheel gear teeth, and this disengagement will be maintained by the spring 142 upon deenergizing of the starter motor. The driving interconnection between the hub 126 and the pinion gear 132 is due to frictional engagement between the flange 128 and the friction member 134, and thus a shock absorbing and friction drive is achieved which minimizes wear between the pinion gear and flywheel gear teeth, and permits a smooth engagement between the pinion gear and fly teeth. As will be appreciated in FIG. 3, a portion of the friction member 134 extends axially to the left beyond the hub 126, for engagement with the end cap 132, to cushion the return of the pinion gear to the "at rest" position shown in FIG. 3, and brake the rotation of the pinion gear assembly.

The details of construction of the starter components as previously described form the subject matter of my U.S. Pat. application Ser. No. 283,560, filed Aug. 24, 1972.

Figure 11:
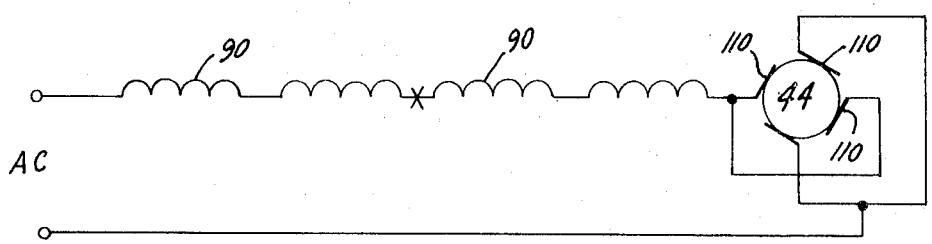
FIG. 11 is a view of the circuit of the motor when utilizing a 110 volt AC power source.

The electric motor components above described may be used with either a 110 volt AC power source, or a 12 volt DC battery power source. If an AC power source is used the circuit shown in FIG. 11 is preferably employed wherein the field coils 90 are connected in series, and are connected to opposed brushes 110. The other opposed brushes are connected to the other AC source. A switch, not shown in the circuit, is used to selectively energize the motor.

Figure 12:
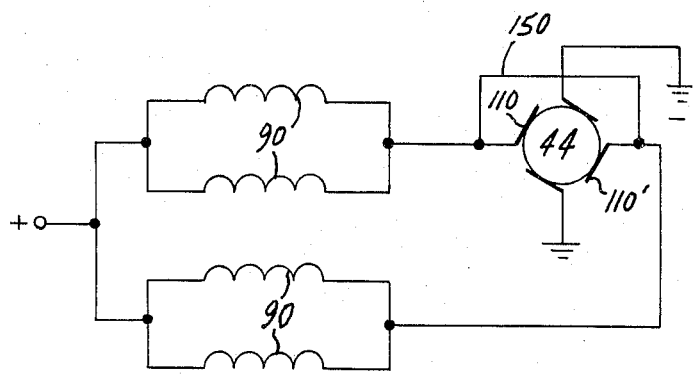
FIG. 12 is a circuit view of the preferred circuit of the electric motor when used with a 12 volt DC power source.

When DC battery source is used to energize the starter motor, the basic relationship between the battery and electric motor may be similar to that shown in my U.S. Pat. No. 3,536,051. With DC operation the electric circuit shown in FIG. 12 is preferred. In this circuit two of the field coils 90 are connected in parallel, and connected to a common brush 110. Likewise, the other two field coils 90 are connected to the brush 110'. A shunt 150 interconnects the brushes 110 and 110' to equalize the voltage to improve the stall characteristics and equalize the voltage at the commutator. In the DC circuit, the wiring of the field coil poles in parallel reduces the size of the field wire, simplifies winding of the field, and produces improved torque characteristics.

The convex configuration of the motor housing sidewalls 24, and the location of the poles 56 in the corners of the housing provides sufficient clearance to permit the coils 90 to be wound after the stack 66 and end insulators are assembled in the housing, thereby reducing manufacturing costs and provides a superior assembly. Also, the noncircular configuration of the sidewalls 24 and the laminations 50 prevents rotation of the laminations, and provides a positive "keying" action.

It is appreciated that various modifications to the inventive concept may be apparent to those skilled in the art without departing from the spirit and scope of the invention.

I claim:

1. An electric starter motor characterized by its compact size and ability to produce high torque forces comprising, in combination, an elongated housing having ends, an axis and four sidewalls, said sidewalls being of a convex configuration having an axis of generation parallel to said housing axis, adjacent sidewalls intersecting and defining a corner, a field coil defined within said housing within each corner, an end cap mounted upon each housing end, an armature extending through said housing having a commutator and rotatably supported on said end caps, a brush card of dielectric material within said housing adjacent an end thereof, a plurality of electrical conducting brushes mounted on said card engaging said armature commutator, engine starter drive means operatively connected to said armature, said field coils being defined by a stack of metal laminations having ends, a dielectric insulator within said housing located adjacent each end of said stack and a coil of electrical conductive wire wrapped about each field coil and its associated end insulators.

2. In an electric starter motor as in claim 1 wherein four brushes are mounted upon said brush card, two diametrically opposed brushes being grounded to said housing and each of the other two diametrically opposed brushes being connected in series with two parallel connected field coils.

3. In an electric starter motor as in claim 2, a shunt interconnecting said other two brushes to equalize the voltage at said commutator.

4. In an electric starter motor as in claim 1 wherein said field laminations each include an indentation nesting with and frictionally engaging a like indentation in the adjacent lamination whereby said indentations constitute mechanical connection means between said laminations.

5. An electric starter motor characterized by its compact size and ability to produce high torque forces comprising, in combination, an elongated tubular housing having ends and a central region, a plurality of field laminations forming a stack located within said central region, said stack having ends within the length of said housing, poles defined upon said laminations, an annular synthetic plastic insulator located within said housing located adjacent each end of said stack, said insulators each including an axially extending recess opening toward the adjacent housing end, said recesses being defined by axially extending projections aligned with said poles whereby said recesses are aligned with said poles, a coil of wire coiled about each field pole and received within the insulator recesses defined at the end of each pole, an end cap mounted on each end of said housing, an armature rotatably mounted on said end caps extending through said field stack and said insulators, said armature having an extension extending exteriorly of said housing, brushes within said housing engaging a commutator defined on said armature, and starter drive means mounted on said armature extension.

6. In an electric starter motor as in claim 5 wherein said brushes are mounted upon a brush card of dielectric material.

7. In an electric starter motor as in claim 6 wherein four brushes are mounted upon said brush card, two diametrically opposed brushes being grounded to said housing and each of the other two diametrically opposed brushes being connected in series with two parallel connected field coils.

8. In an electric starter motor as in claim 7, a shunt interconnecting said other two brushes to equalize the voltage at said commutator.

* * * * *